(12) United States Patent
Bevilacqua et al.

(10) Patent No.: US 11,280,256 B2
(45) Date of Patent: Mar. 22, 2022

(54) EXHAUST-GAS TURBOCHARGER AND MOTOR VEHICLE

(71) Applicant: Dr. Ing. h.c. F. Porsche Aktiengesellschaft, Stuttgart (DE)

(72) Inventors: Vincenzo Bevilacqua, Ditzingen (DE); Wolfgang Zücker, Ditzingen (DE); Giovanni Corvaglia, Modena (IT)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/363,179

(22) Filed: Jun. 30, 2021

(65) Prior Publication Data

US 2022/0003152 A1    Jan. 6, 2022

(30) Foreign Application Priority Data

Jul. 1, 2020   (DE) ............ 10 2020 117 321.0

(51) Int. Cl.
*F02B 37/04*   (2006.01)
*F02B 39/10*   (2006.01)

(52) U.S. Cl.
CPC ............ *F02B 37/04* (2013.01); *F02B 39/10* (2013.01)

(58) Field of Classification Search
CPC ......... F02B 37/04; F02B 37/001; F02B 39/10
See application file for complete search history.

(56) References Cited

U.S. PATENT DOCUMENTS

| | | | |
|---|---|---|---|
| 2,397,941 A | | 4/1946 | Birkigt |
| 4,294,074 A | * | 10/1981 | Striebich ............ F02C 6/00 60/616 |
| 2010/0170245 A1 | | 7/2010 | Amos et al. |
| 2010/0278628 A1 | | 11/2010 | Ooyama |
| 2013/0227944 A1 | * | 9/2013 | Denholm ............ F02B 37/002 60/605.1 |
| 2016/0252009 A1 | * | 9/2016 | Hunter ............ F02B 37/004 60/612 |
| 2016/0376021 A1 | * | 12/2016 | Ullyott ............ F02B 41/10 60/783 |
| 2017/0268409 A1 | * | 9/2017 | Thomassin ............ B64C 9/38 |
| 2018/0328233 A1 | * | 11/2018 | Choi ............ F01D 15/10 |

(Continued)

FOREIGN PATENT DOCUMENTS

| | | |
|---|---|---|
| DE | 102007017777 A1 | 10/2008 |
| DE | 102009053490 A1 | 5/2011 |

(Continued)

OTHER PUBLICATIONS

Rahnke, CJ. "Axial Flow Automotive Turbocharger." Proceedings of the ASME 1985 International Gas Turbine Conference and Exhibit. vol. 1: Aircraft Engine; Marine; Turbomachinery; Microturbines and Small Turbomachinery. Houston, Texas, USA. Mar. 18-21, 1985. V001T04A001. (Year: 1985).*

(Continued)

*Primary Examiner* — Ngoc T Nguyen

(74) *Attorney, Agent, or Firm* — RatnerPrestia

(57) ABSTRACT

An exhaust-gas turbocharger for a motor vehicle includes a compressor, a first and a second axial turbine, an electrical generator and an electric motor. The axial turbines are configured to drive the generator. The generator is configured to provide a feed to the electric motor. The electric motor is configured to drive the compressor.

7 Claims, 7 Drawing Sheets

(56) References Cited

U.S. PATENT DOCUMENTS

2019/0003405 A1* 1/2019 Fluhler ................ F02B 39/10
2019/0257234 A1 8/2019 Sasaki et al.

FOREIGN PATENT DOCUMENTS

| DE | 102018109138 A1 | 10/2019 |
|---|---|---|
| WO | 2013051303 A1 | 4/2013 |
| WO | 2019241078 A1 | 12/2019 |

OTHER PUBLICATIONS

Great Britain Combined Search and Examination Report for Great Britain Application No. GB2109548.4, dated Nov. 22, 2021, 4 pages.

* cited by examiner

EXHAUST-GAS TURBOCHARGER AND MOTOR VEHICLE

CROSS-REFERENCE TO RELATED APPLICATION

This application claims priority to German Patent Application No. 10 2020 117 321.0, Jul. 1, 2020, the content of such application being incorporated by reference herein in its entirety.

FIELD OF THE INVENTION

The present invention relates to an exhaust-gas turbocharger. The present invention also relates to a corresponding motor vehicle.

BACKGROUND OF THE INVENTION

It is well known for internal combustion engines for road-going vehicles to be equipped with one or more turbochargers.

Conventional turbochargers are distinguished by a radial compressor that is connected via a shaft to a radial turbine.

Instead of radial turbines (FIG. 1), in the case of which the hot exhaust gas is caused to flow radially onto the turbine wheel, use is sometimes made of so-called mixed-flow turbines (FIG. 2) or axial turbines (FIG. 3), in the case of which the flow is conducted axially or partially axially onto the wheel.

In the case of an engine with six or more cylinders, it is commonly the case that the exhaust gases from three or more cylinders are merged and conducted onto a turbine. This means that the engine is equipped with two exhaust-gas turbochargers (biturbo), or more seldom also with four turbochargers.

Here, each turbine is conventionally connected via a dedicated shaft to a compressor. U.S. Pat. No. 2,397,941A, which is incorporated by reference herein, furthermore describes the coupling of two axial turbines by means of a common shaft.

It is basically also known for the turbine and compressor of a supercharging system not to be coupled to one another by means of a shaft, but for the turbine to be connected to a generator and the compressor connected to an electric machine (hereinafter also abbreviated to "E-machine"). In this regard, reference is made by way of example to DE 10 2007 017 777B4, which is incorporated by reference herein.

Figure 4:
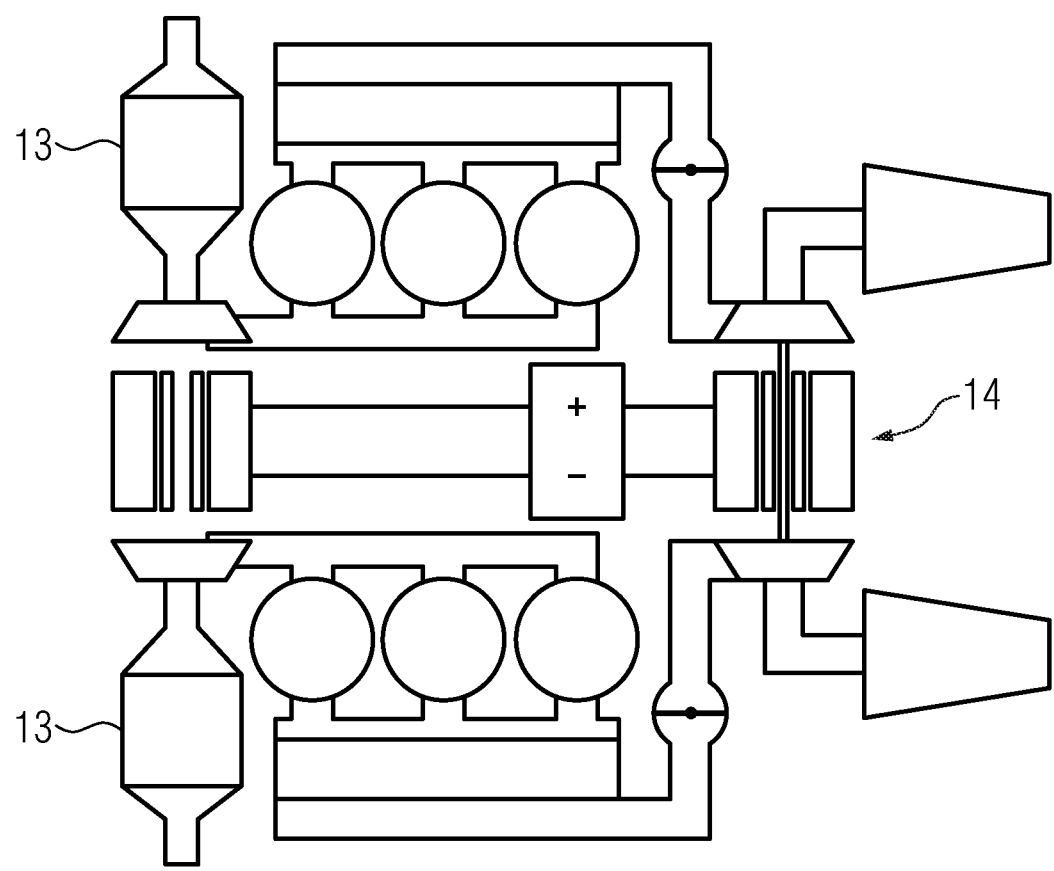

It has furthermore been proposed for two turbines to be connected to one shaft, which turbines output the power absorbed by them via an E-machine which is likewise mounted on the shaft. Here, two compressors are likewise connected, on one shaft, to an E-machine. In this way, the compressors and turbines can be operated separately from one another with their respective E-machines (FIG. 4).

Figure 5:
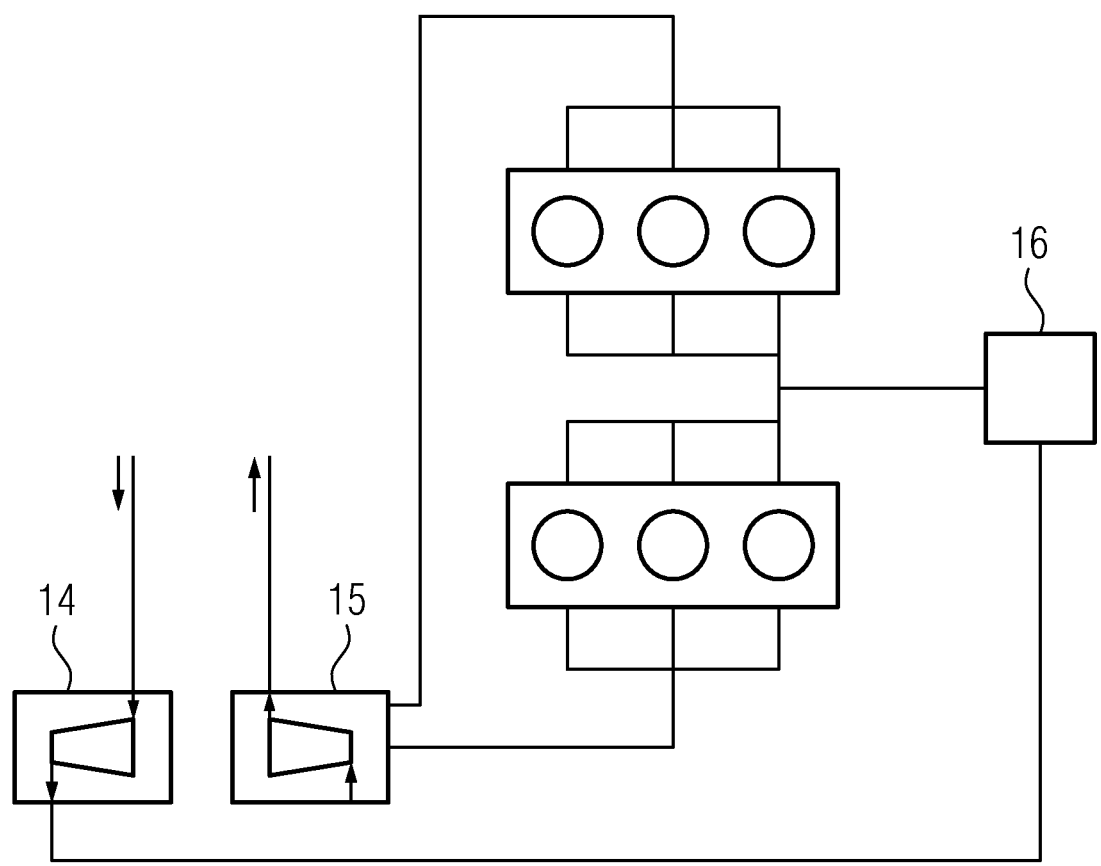

In a turbocharger arrangement according to FIG. 5, the turbine and compressor are connected on a common shaft. The turbine power is conventionally controlled by means of a bypass valve, such that the compressor can absorb sufficient power to generate the required charge pressure. In the case of such a radial arrangement of the turbine, the size thereof is specified such that a major proportion of the exhaust gases flows not through the turbine but through the bypass valve, because the power availability would otherwise be too high.

If the bypass valve were to remain closed and the entire exhaust-gas mass flow were to flow through the exhaust-gas turbine, the pressure upstream of the turbine would thus increase so intensely that the performance of the internal combustion engine would be impaired.

SUMMARY OF THE INVENTION

The invention provides an exhaust-gas turbocharger and a corresponding motor vehicle.

An advantage of this solution lies in the fact that the speed of turbine and compressor can be set independently of one another in order to set the respectively optimum operating point for generator and electric motor.

Furthermore, in order to extract the greatest possible amount of energy from the exhaust gas, the bypass valve can be completely closed, and the entire exhaust-gas mass flow can be conducted via the turbine.

Two possibilities are presented for counteracting the adverse effect of an intense pressure increase upstream of the turbine. For this purpose, use is made, on the one hand, of an enlargement of the radial turbine and, on the other hand, of the variation of the "intake capacity" of the turbine through the use of an axial turbine, which can achieve high levels of efficiency without the need for a large pressure ratio.

BRIEF DESCRIPTION OF THE DRAWING FIGURES

Exemplary embodiments of the invention are illustrated in the drawings and are described in more detail below.

Figure 1:
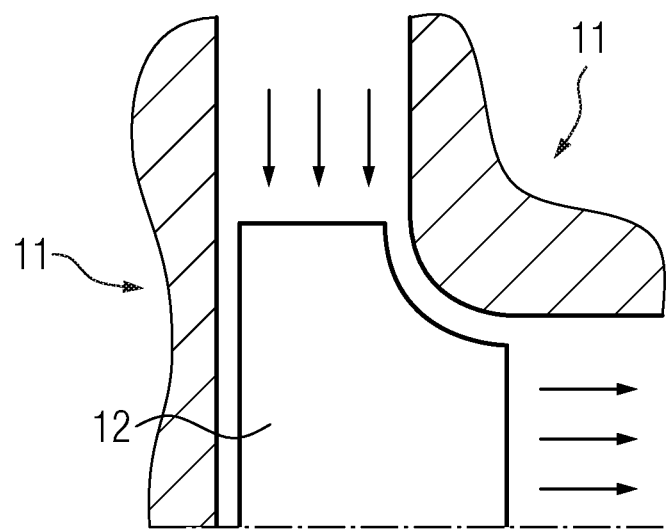
Figure 2:
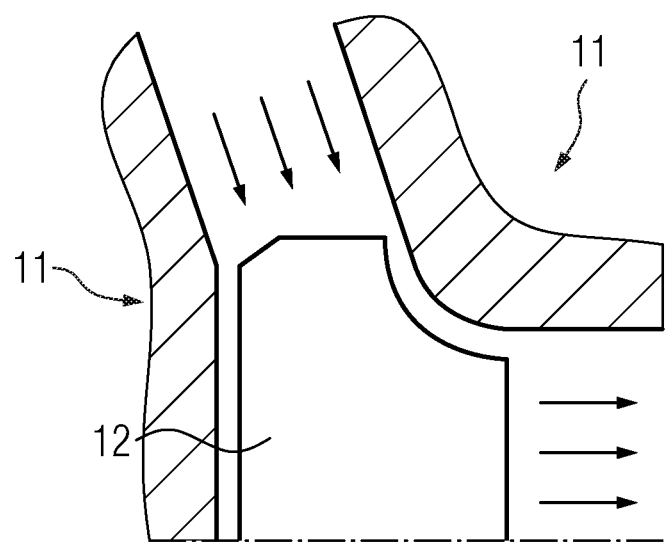
Figure 3:
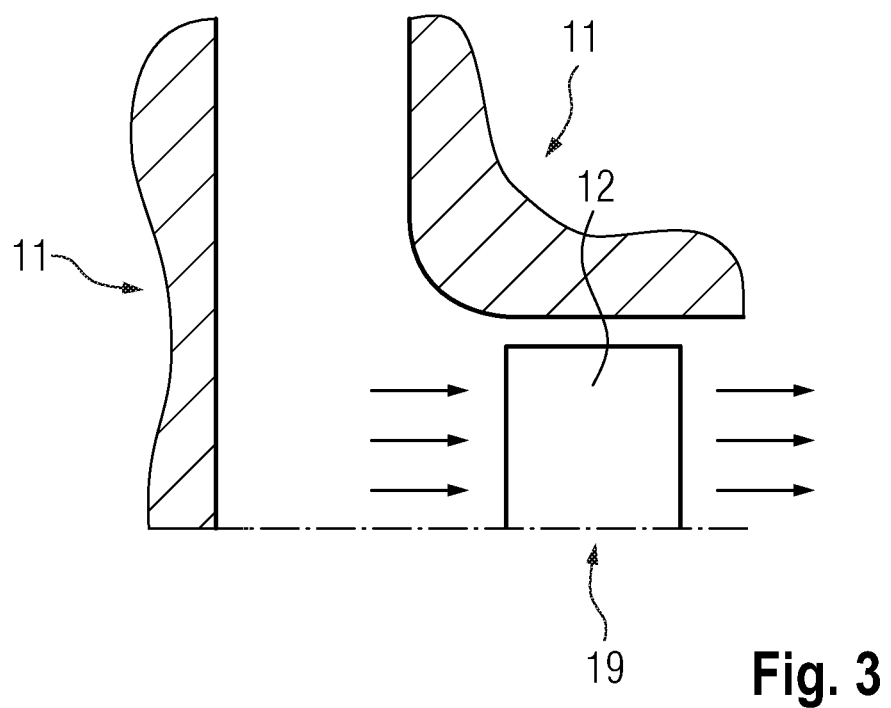
Figure 6:
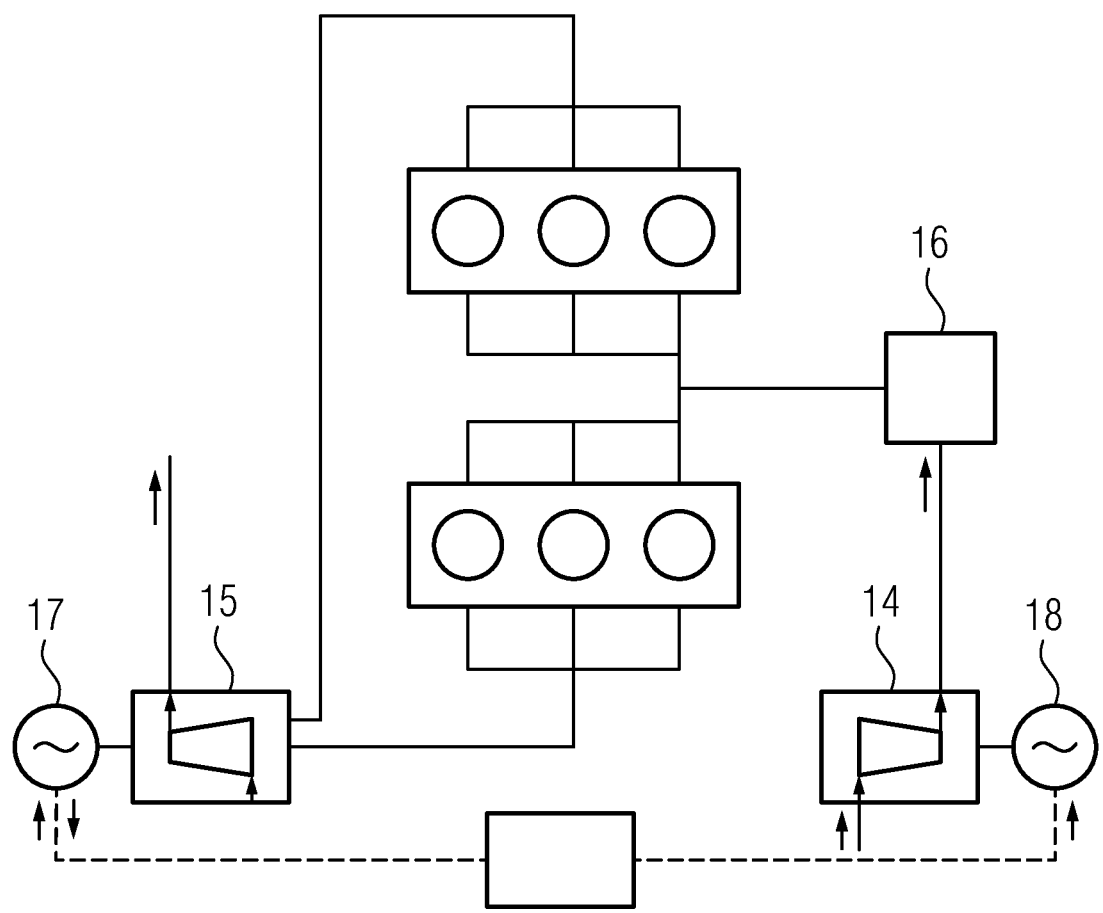
Figure 7:
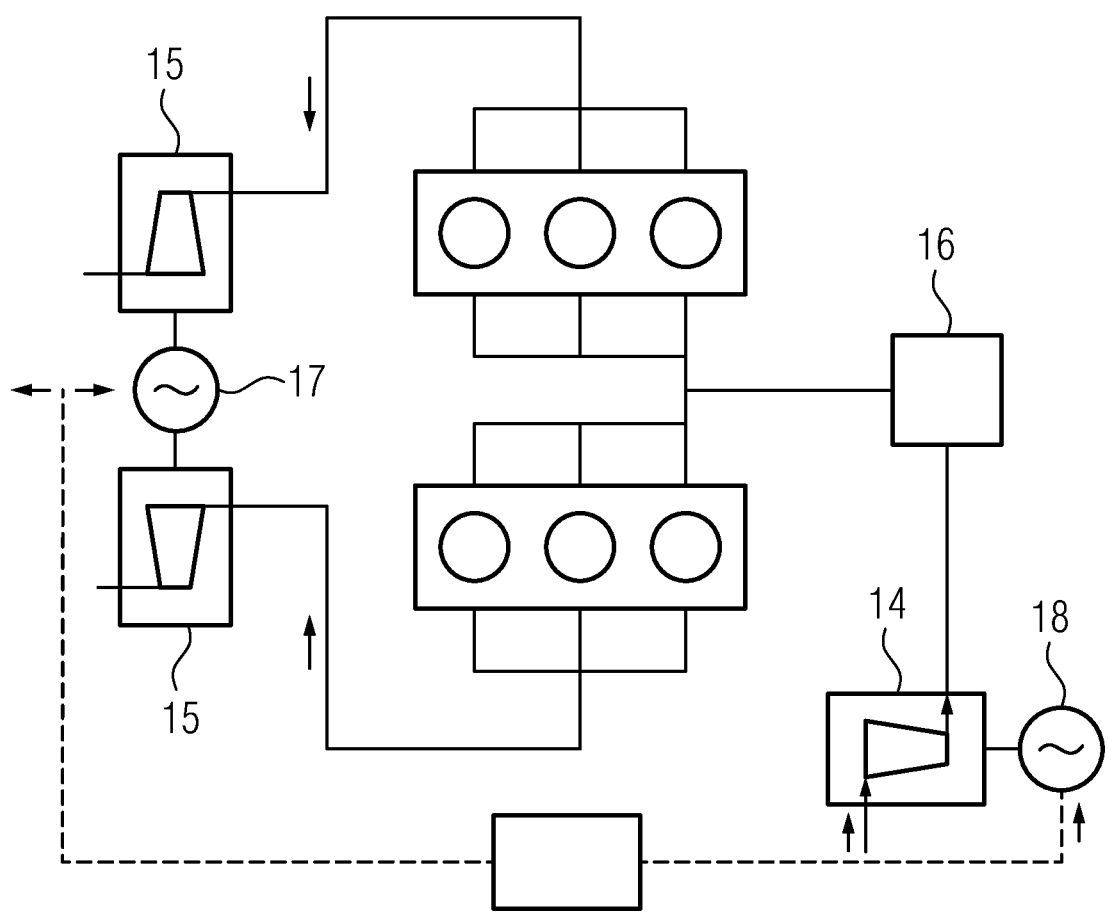
Figure 8:
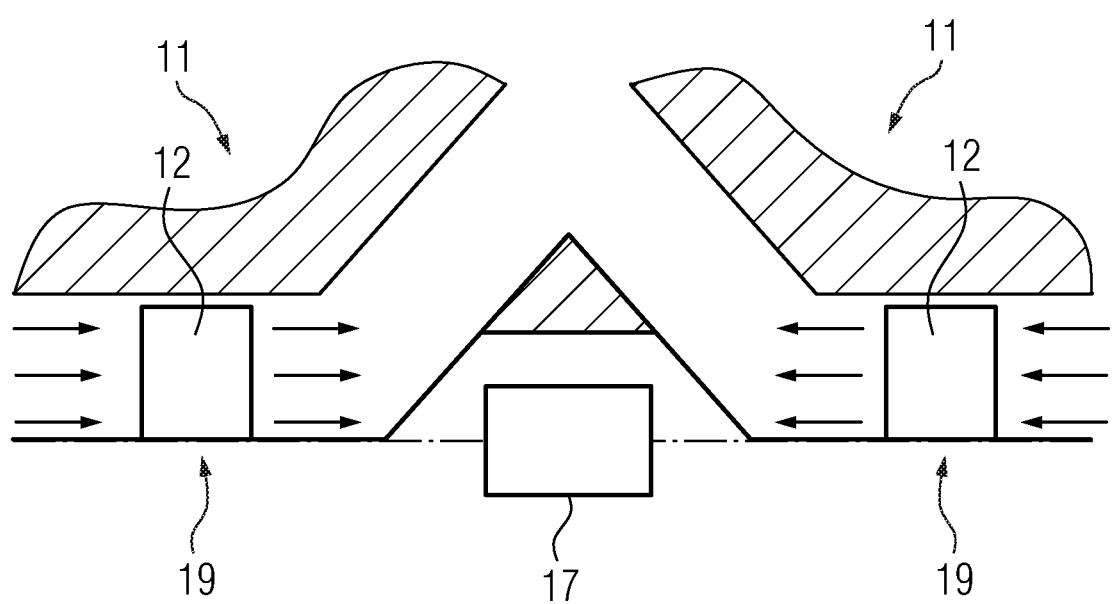

FIG. 1 shows a radial turbine.
FIG. 2 shows a mixed-flow turbine.
FIG. 3 shows an axial turbine.
FIG. 4 shows a biturbo-type turbocharger arrangement.
FIG. 5 shows a conventional turbocharger arrangement.
FIG. 6 shows a first embodiment of the invention.
FIG. 7 shows a second embodiment of the invention.
FIG. 8 shows a detail of the second embodiment.

DETAILED DESCRIPTION OF THE INVENTION

As per FIG. 6, the exhaust-gas turbine (15) and the compressor (14) are not connected by means of a common shaft, but are connected in each case to an electric machine (17, 18).

FIG. 7 illustrates an engine concept with six cylinders distributed across two cylinder banks. The illustrated arrangement provides that a compressor (14) is driven by an electric motor (18) and provides the charge pressure required for the internal combustion engine.

On the exhaust-gas side, provision is made for two axial turbines (19) and one generator (17) to be arranged on a common shaft, wherein the generator (17) is arranged between the axial turbines (19). This arrangement will be described below on the basis of FIG. 8.

As can be seen from the figure, the axial turbines (19) are, by contrast to the conventional situation, impinged on by flow from the outside, such that an optimum impingement of flow on the blades (12) is possible, and no diversion is necessary. Each bank of the engine thus flows through one axial turbine (19).

At the turbine outlet, the two exhaust-gas flows are merged and can be conducted onward to a common exhaust-gas catalytic converter (13).

It is self-evident that the arrangement described above on the basis of axial turbines (19) may, with suitable adaptations, be implemented with two radial or other exhaust-gas turbines (15) without departing from the scope of the invention.

What is claimed:

1. An exhaust-gas turbocharger comprising a compressor, a first and a second axial turbine, an electrical generator and an electric motor, wherein the axial turbines are each configured to drive the generator, wherein the generator is configured to provide a feed to the electric motor, and, wherein the electric motor is configured to drive the compressor.

2. The exhaust-gas turbocharger as claimed in claim 1, wherein the first axial turbine and the second axial turbine have a common output shaft, and the generator is arranged on the common output shaft.

3. The exhaust-gas turbocharger as claimed in claim 2, wherein the generator is arranged between the first axial turbine and the second axial turbine.

4. The exhaust-gas turbocharger as claimed in claim 3, wherein the axial turbines each comprise a turbine housing and a turbine wheel mounted rotatably within the turbine housing, and the axial turbines are configured such that the turbine wheels are impinged on by flow in opposite directions along the common output shaft.

5. The exhaust-gas turbocharger as claimed in claim 4, wherein the axial turbines further comprise a common outlet, and the common outlet is fluidically connected to an exhaust-gas catalytic converter.

6. A motor vehicle comprising the exhaust-gas turbocharger and the exhaust-gas catalytic converter as claimed in claim 5.

7. The motor vehicle as claimed in claim 6, wherein the motor vehicle further comprises a charge-air cooler, and wherein the compressor is fluidically connected to the charge-air cooler.

* * * * *